US00RE36349E

United States Patent [19]

Matsumiya et al.

[11] E Patent Number: Re. 36,349

[45] **Reissued Date of Patent: *Oct. 26, 1999**

[54] CONTROL-KEY MECHANISM HAVING IMPROVED OPERATION FEELING

[75] Inventors: Hiroshi Matsumiya, Tokyo; Takeki Sugiyama, Shimizu, both of Japan

[73] Assignee: Sega Enterprises, Tokyo, Japan

[ * ] Notice: This patent is subject to a terminal disclaimer.

[21] Appl. No.: 09/095,259

[22] Filed: Jun. 10, 1998

Related U.S. Patent Documents

Reissue of:

[64] Patent No.: 5,525,770
Issued: Jun. 11, 1996
Appl. No.: 08/338,699
Filed: Nov. 14, 1994

U.S. Applications:

[63] Continuation of application No. 08/098,435, Jul. 28, 1993, Pat. No. 5,396,036.

[30] Foreign Application Priority Data

Jul. 31, 1992 [JP] Japan ..... 4-059472
Oct. 26, 1992 [JP] Japan ..... 4-080210

[51] Int. Cl.[6] ..... H01H 25/04

[52] U.S. Cl. ..... 200/6 A; 200/5 A; 200/339

[58] Field of Search ..... 200/5 R, 5 A, 200/6 A, 17 R, 18, 339, 512–517, 553, 557; 463/37

[56] References Cited

U.S. PATENT DOCUMENTS

| | | | |
|---|---|---|---|
| 4,246,452 | 1/1981 | Chandler | 200/5 A |
| 4,256,931 | 3/1981 | Palisek | 200/5 A |
| 4,349,708 | 9/1982 | Asher | 200/6 A |
| 4,408,103 | 10/1983 | Smith, III | 200/6 A |
| 4,414,438 | 11/1983 | Maier et al. | 200/6 A |
| 4,439,648 | 3/1984 | Reiner et al. | 200/6 A |
| 4,486,629 | 12/1984 | Sledesky | 200/6 A |
| 4,511,769 | 4/1985 | Sahakian et al. | 200/6 A |
| 4,614,847 | 9/1986 | Sasao | 200/6 A |
| 4,687,200 | 8/1987 | Shirai | 200/339 X |
| 4,733,024 | 3/1988 | Takeshima et al. | 200/5 A X |
| 4,896,003 | 1/1990 | Hsieh | 200/6 A |
| 4,947,461 | 8/1990 | Yoshioka et al. | 200/5 R |
| 4,992,631 | 2/1991 | Gee | 200/5 A |
| 5,283,401 | 2/1994 | Schmucker | 200/6 A |
| 5,396,030 | 3/1995 | Matsumiya et al. | 200/6 A |

FOREIGN PATENT DOCUMENTS

| | | | |
|---|---|---|---|
| 54-121379 | 9/1979 | Japan . | |
| 58-176822 | 10/1983 | Japan | H01H 25/04 |
| 59-033641 | 3/1984 | Japan | H01H 25/04 |
| 62-092535 | 6/1987 | Japan | H01H 25/04 |
| 63-20336 | 2/1988 | Japan . | |
| 63-66811 | 3/1988 | Japan . | |
| 63-52234 | 4/1988 | Japan . | |
| 63-137427 | 9/1988 | Japan | H01H 25/04 |

*Primary Examiner*—J. R. Scott
*Attorney, Agent, or Firm*—Michael N. Meller; Eugene Lieberstein

[57] ABSTRACT

A tilting member has a force bearing portion to which operating force is applied, and a supported surface. A supporting member has a supporting projection with which the supported surface of the tilting member may come in contact. When the operating force is applied to the tilting member, the tilting member tilts with respect to the supporting member. The supporting member supports the tilting member at a supporting point where the supporting projection of the supporting member is in contact with the supported surface of the tilting member, about which supporting point the tilting member tilts. The tilting of the tilting member, with respect to the supporting member, establishes a predetermined electrical contact.

23 Claims, 5 Drawing Sheets

FIG. 6A
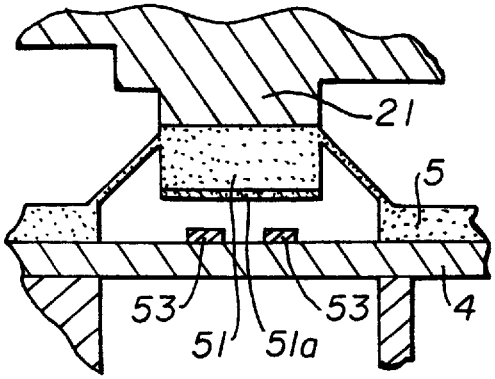
FIG. 6B
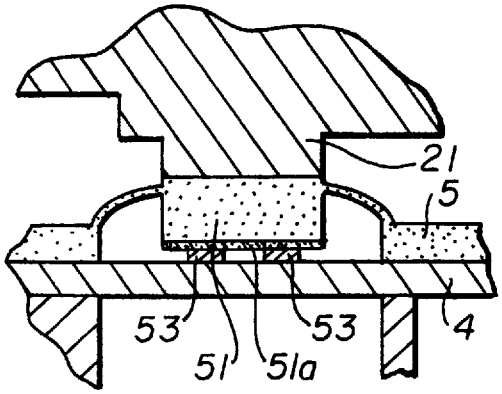
FIG. 7A
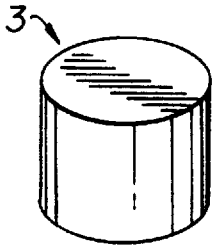
FIG. 7C
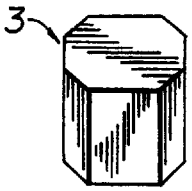
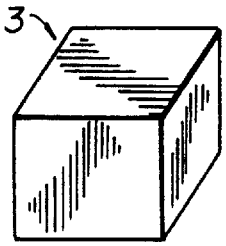
FIG. 7B

CONTROL-KEY MECHANISM HAVING IMPROVED OPERATION FEELING

Matter enclosed in heavy brackets [ ] appears in the original patent but forms no part of this reissue specification; matter printed in italics indicates the additions made by reissue.

This is a continuation of application Ser. No. 08/098,435, filed Jul. 28, 1993 now U.S. Pat. No. 5,396,036.

BACKGROUND OF THE INVENTION

The present invention relates to a control-key mechanism.

In the known art, a kind of control-key mechanism is used, such as, in computers, for example, video game apparatus including video game apparatus of business use or video game apparatus of personal use. In these video game apparatuses, a display screen such as using a liquid crystal display device is provided. In this display screen, a character is moved in response to an operation performed on the video game apparatus by an operator. The character is an object represented on the display screen. The operator may specify the movement of the character using the control-key mechanism such as that mentioned above.

Using the control-key mechanism, the operator may specify or may select a direction in which the character moves. The direction selected is selected from various directions, for example, 4 directions on the screen, that is, the top, bottom, right and left, or 8 directions, the top, bottom, right, left, top left, top right, bottom left, and bottom right.

Such a control-key mechanism has a construction such that the operator may control the character, via the control-key mechanism with very small force being applied to the control-key mechanism by the operator's finger so as to control, for example, the movement of the above-mentioned character displayed on the screen. This is because, for example, the operator has to control the movement of the character very frequently. Thus, if this control needed a relatively large force, the operator's finger would become tired.

The Japanese Utility-Model Publication No.3-13951 corresponding to U.S. Pat. No. 4,687,200, discloses such a conventional control-key mechanism. This conventional control-key mechanism has a key top. A half-spherical shaped projection projects downward from a center of a bottom surface of the key top. The control-key mechanism also has a circuit substrate. In the control-key mechanism, there exists a small space between the top of the half-spherical shaped projection and the circuit substrate.

A elastic supporting member is provided so as to support a disc portion formed on the periphery of the bottom surface of the key top so that the key top is supported on the circuit substrate. Thus, the above-mentioned small space is maintained.

When the operator pushes, in a certain direction, the key top of the above-mentioned conventional control-key mechanism, the top of the half-sphere shaped projection comes in contact with the substrate. Thus, the portion where the top of the half-sphere shaped projection comes in contact with the substrate will act as a supporting point to be used for a seesaw-like movement of the key top on the substrate.

Depending on the direction in which the control-key is being pushed, the key top is tilted in a corresponding direction with the above-mentioned seesaw-like movement using the supporting point. This tilting of the key top causes a conductive rubber, provided on the bottom surface of the supporting member, to come in contact with a plurality of contacts provided on the circuit substrate. This coming in contact with the plurality of contacts, that is, a short-circuiting of the plurality of contacts results in forming a corresponding circuit on the circuit substrate.

In this construction of the conventional control-key mechanism, the following drawback may exist. When the operator operates, that is, pushes the key top in a certain direction, the top of the half-sphere shaped projection is rubbing against the circuit substrate at the portion acting as the above-mentioned supporting point to be used for the seesaw movement. This rubbing is caused by the seesaw movement of the key top on the substrate.

Such rubbing results in a corresponding friction between the top of the half-sphere shaped projection and the counterpart on the circuit substrate. Such friction may damage these rubbing parts so as to shorten a life time of the control-key mechanism.

Further, there may be a case where a relatively large mechanical shock is applied on the key top so as to cause the top of the half-sphere projection to collide with the counterpart on the circuit substrate. Such case also may damage the same parts so as also to shorten the life of the control-key mechanism.

As mentioned above, the control-key mechanism may be operated very frequently by the operator when it is applied, for example, to the video game apparatus. Such frequent operations may excessively facilitate the above-mentioned damages resulting in shortening the life of the control-key mechanism.

SUMMARY OF THE INVENTION

An object of the present invention is to provide a control-key mechanism having an improved construction in which even frequent operations will not excessively facilitate shortening the life thereof.

To achieve the object of the present invention, a control-key mechanism according to the present invention comprises:

a tilting member having a force bearing portion to which operating force is applied, which tilting member also has a supported surface; and a supporting member having a supporting projection with which said supported surface of said tilting member may come in contact; and wherein the operating force which being applied to said force bearing portion of said tilting member, causes said tilting member to tilt with respect to said supporting member while said supporting member supports said tilting member at a supporting point where said supporting projection of said supporting member is in contact with said supported surface of said tilting member, about which supporting point said tilting member tilts; and wherein the tilting of said tilting member, with respect to said supporting member, establishes a predetermined electrical contact.

By the above construction, friction occurring between the supported surface of the tilting member and the supporting projection of the supporting member can be reduced.

Other objects and further features of the present invention will become more apparent from the following detailed description when read in conjunction with the accompanying drawings.

BRIEF DESCRIPTION OF THE DRAWINGS

FIGS. 7A, 7B and 7C show various alternative shapes for the supporting member shown in FIG. 2.

DESCRIPTION OF THE PREFERRED EMBODIMENTS

Figure 1:
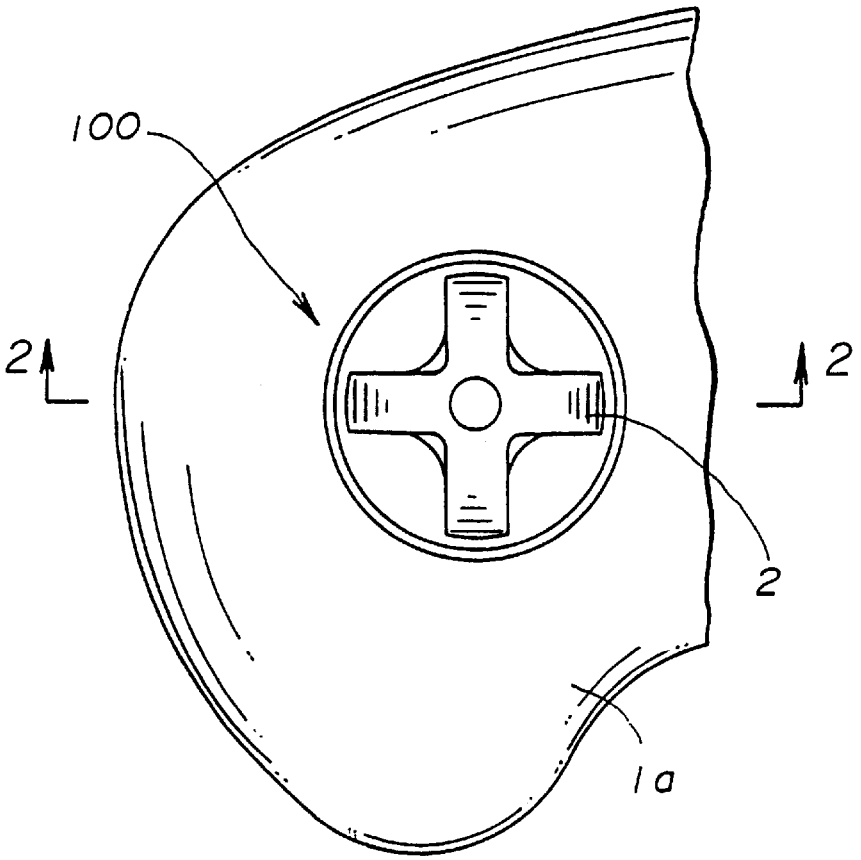
FIG. 1 shows a plan view of a control-key mechanism according to a first embodiment of the present invention.

A control-key mechanism according to the first embodiment of the present invention will now be described with reference to FIGS. 1 and 2.

An upper housing 1a and a lower housing 1b together enclose the control-key mechanism so as to protect it. The control-key mechanism 100 has a key-top member 2. A key-top member 2 comprises a key top 2a having a short cylindrical shape. The central axis of this cylindrical shape extends vertically in FIG. 2. A top of the key top 2a is exposed from the upper housing 1a through an opening 11 provided in the upper housing 1a. The key top 2a can move in the opening 11 because the inner diameter of the opening 11 is larger than the outer diameter of the key top 2a.

Figure 2:
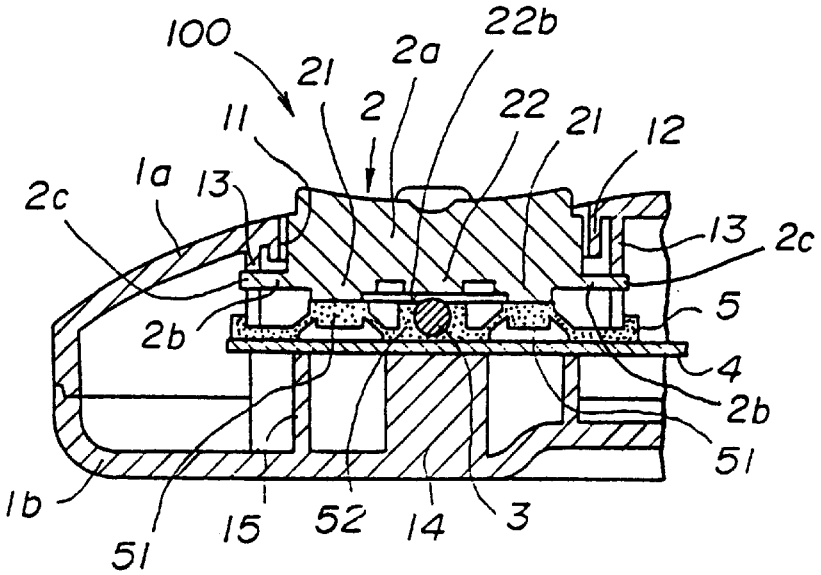
FIG. 2 shows a sectional view of the control-key mechanism shown in FIG.1 taken along the line 2—2 in FIG. 1.

Four contact pushing portions 21, 21, 21 and 21 respectively project downward in FIG. 2 from the bottom surface of the key-top member 2. FIG. 2 shows only two contact pushing portions 21 and 21 both arranged in the left and the right in FIG. 2. The other two contact pushing portions 21 and 21 are arranged above and below the plane of the sheet on which FIG. 2 is represented. That is, the four contact pushing portions 21, 21, 21 and 21 are arranged in the top, bottom, left and right in the directions top, bottom, left and right being directions in the view shown in FIG. 1.

A supported portion 22 projects downward in

FIG. 2 from the center of the bottom surface of the key-top member 2. The bottom surface 22b of the supported portion 22 has a plane shape.

The key-top member 2 also comprises a bottom peripheral disk 2b. The bottom peripheral disk 2b extends horizontally in FIG. 2 and extends peripherally from the bottom of the key-top member 2. Thus, the bottom peripheral disk 2b has a shape like a disk having a diameter larger than the diameter of the key top 2a and the disk 2b has a central axis the same as that of the cylindrical shape of the key top 2a. The bottom peripheral disk 2b is enclosed in the housings 1a and 1b.

Figure 2A:
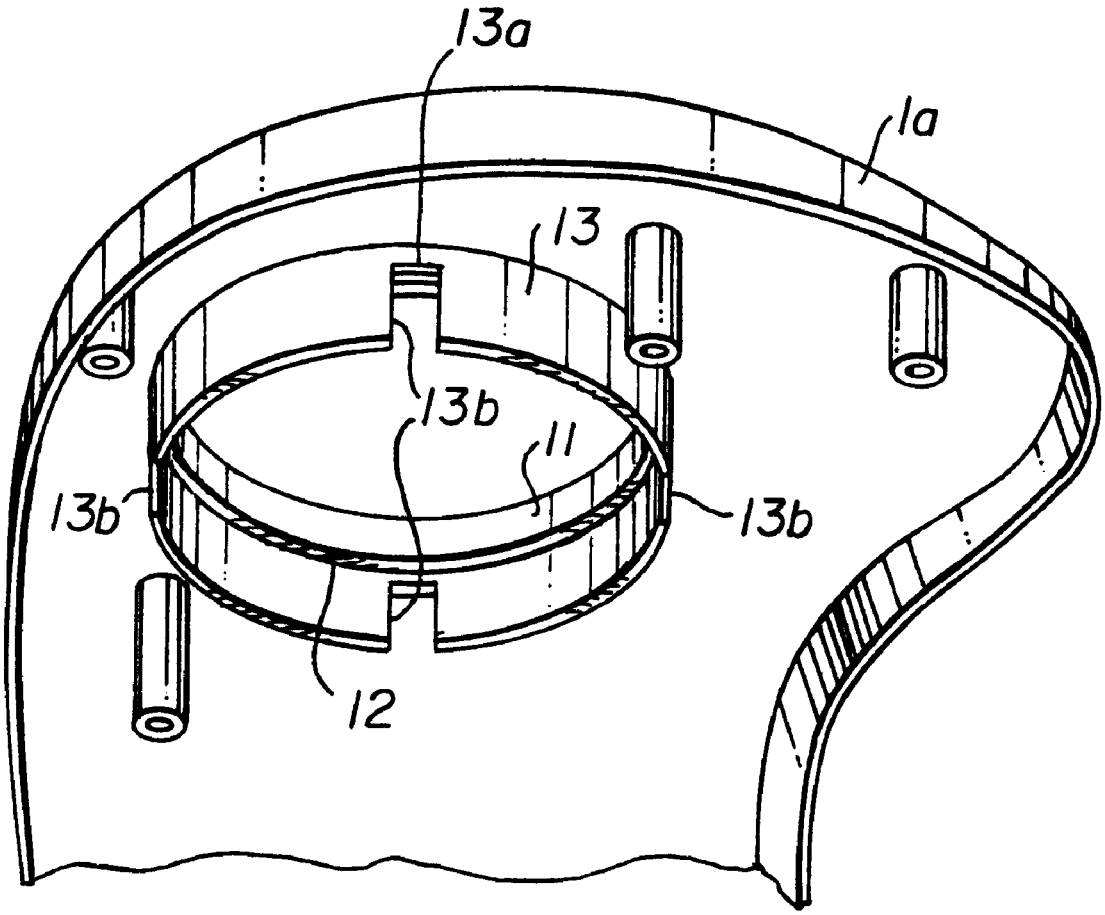
FIG. 2A shows a bottom perspective view of part of the housing 1A when viewed from the left side in FIG. 2.

As shown in FIGS. 2 and 2A, the upper housing 1a has double ring-shape walls 12 and 13 which respectively extend downward from the bottom surface thereof. The double ring-shape walls 12 and 13 respectively have the same central axis identical to the central axis of the key top 2a. The outer ring-shape wall 12 has a diameter slightly smaller than that of the ring-shape wall 13 and defines the opening 11 through which the key-top is exposed to the outside of the housing 1a. The ring-shape wall 13 has vertical slots 13b, 13b, 13b, 13b. The bottom ends of portions 13a, 13a, 13a, 13a of the ring-shape wall 13 are formed and located at a lower portion than the bottom end of the ring-shape wall 12.

Figure 5:
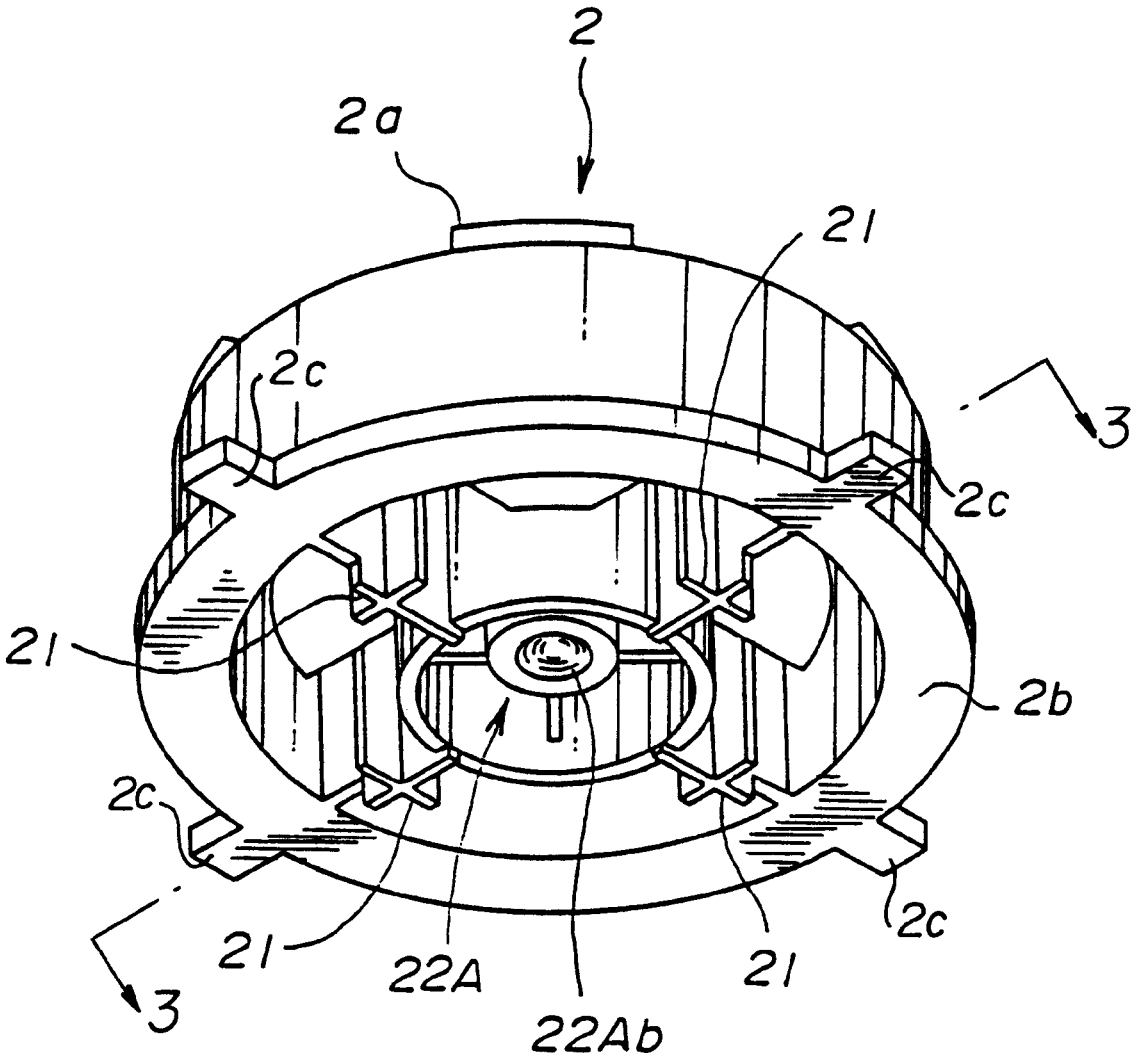
FIG. 5 shows a perspective view of a key-top member of the control-key mechanism shown in FIG. 4, viewed from the bottom-side oblique direction, that is, in the direction C in FIG. 4, FIGS. 6A and 6B show enlarged partial side-elevational views of the structure shown in FIG. 2 with FIG. 6A showing a state in which no downward pressure is applied to the key-top member, and with FIG. 6B showing a state in which a downward pressure has been applied to the key-top member so that the conductive layer 51a comes into contact with the contacts 53, 53.

There are provided four legs 2c, 2c, 2c, 2c protruding from the bottom peripheral disk 2b as shown in FIG. 5. The key-top member 2 is disposed so that the legs 2c, 2c, 2c, 2c are located at the vertical slots, respectively whereby sideways type and upward type movements of the key-top member 2 are effectively restricted to thereby keep the key-top member 2 movably within the restricted positions of the housing 1a.

There are provided four legs 2c, 2c, 2c, 2c protruding from the bottom peripheral disk 2b as shown in FIG. 5. The legs 2c, 2c, 2c, 2c, face the bottom end of the ring-shaped wall 13.

Four rubber contacts 51, 51, 51 and 51 are respectively in contact with the corresponding four contact pushing portions 21, 21, 21 and 21. These rubber contacts 51, 51, 51 and 51 are respectively electrically conductive. The four rubber contacts 51, 51, 51 and 51 are parts of a elastic body 5 made of elastic material. The positions of four rubber contacts 51, 51, 51 and 51 are respectively aligned vertically in FIG. 2 with the positions of the contact pushing portions 21, 21, 21 and 21. That is, the four rubber contacts 51, 51, 51 and 51 are respectively located just under the corresponding contact pushing portions 21, 21, 21 and 21 in FIG. 2.

A supporting member 3 having a sphere shape is located just under in FIG. 2 the bottom surface 22b of the supported portion 22. The supporting member 3 is placed on a supporting portion 52 which fit a part of and located in the center of the elastic body 5. The supporting portion 52 has an approximately cylindrical shape having a concavity formed on the center of the top in FIG. 2 surface thereof. The supporting member 3 is fitted in the concavity of the supporting portion 52. The elastic body 5 is placed on a circuit substrate 4.

The supporting member 3 is preferably made of a steel ball. This is because it is easy to manufacture a precise sphere shape with steel.

A base 14 and a supporting wall 51 respectively project upward in FIG. 2 from the top surface of the lower housing 1b. The supporting wall has a shape such as encircling the base 14. The circuit substrate 4 is placed on the top surfaces of the base 14 and the supporting wall 15 so as to extend horizontally.

Four contact portions, not shown in the figures, are respectively located on the top in FIG. 2 surface of the circuit substrate 4. The positions of the four contact portions are respectively vertically in FIG. 2 aligned with the four rubber contacts 51, 51, 51 and 51. That is, the four contact portions are respectively located just under the corresponding four rubber contacts 51, 51, 51, and 51 in FIG. 2.

Downward in FIG. 2 movement of a rubber contact 51 among the four rubber contacts 51, 51, 51 and 51 results in it coming in contact with the corresponding contact portion among the above-mentioned four contact portions. The rubber contact 51 coming in contact with the contact portion establishes a corresponding electrical contact among four kinds of electrical contacts. These four kinds of electrical contacts respectively establish four corresponding kinds of electrical circuits on the circuit substrate 4.

For example, as shown in FIGS. 6A and 6B, each of the four contact portions comprises two separate contacts 53, 53. Thus, the corresponding rubber contact 51 which has a conductor layer 51a on the bottom surface thereof coming in contact with the contact portion causes the corresponding two contacts to be short-circuited accordingly.

The four rubber contacts 51, 51, 51 and 51 are respectively vertically apart from the four contact portions provided on the circuit substrate 4 while no operation force is applied to the key-top member 2.

The elastic body 5 has a function resulting from its elasticity such as to push up in FIG. 2 the key-top member 2 upward. Thus, the top surfaces of the legs 2c which extend from the edge of the bottom peripheral disk 2b makes contact with the bottom edges of the portions 13a, 13a, 13a, 13a at the vertical slots 13b, 13b, 13b, 13b.

The operator may, with his or her finger top, push the key top 2a at any position among the top, bottom, left and right in FIG. 1 positions thereof downward in FIG. 2. Then, the pushed position of the key top 2a moves downward and thus the corresponding contact pushing portion 21 pushes the corresponding rubber contact 51. Then, the elastic body 5 is transformed by the pushing by means of the contact pushing portion 21 so that the rubber contact 51 moves downward in FIG. 2.

Thus, the key-top member 2 is tilted and thus the supported portion 22 moves downward in FIG. 2. Thus, the supported portion 22 comes in contact with the top of the supporting member 3. Thus, the key-top member 2 is further tilted about the supporting member 3. In this tilting, the position, of the key-top member 2, on which position the operator is pushing, lowers in FIG. 2 so as to become lower than the other positions. For example, when a pushing force F is applied to the right top surface of the key-top 2, the right portion of the key-top 2 lowers while the movement of the left leg 2c is fixed by the bottom surface of the ring-shaped wall 13.

Thus, the lowering contact portion 21, corresponding to the above-mentioned lowering position of the key-top member 2, pushes the corresponding rubber contact 51. Thus, this rubber contact 51 lowers accordingly so as to come in contact with the corresponding contact portion provided on the circuit substrate 4. Thus, for example, as mentioned above, the corresponding two separate contacts become short-circuited.

As mentioned above, this control-key mechanism 100 may be used in, for example, a video game apparatus. In this case, the control-key mechanism is used to control movement of a character displayed on the screen, as mentioned above. The electrical circuits formed on the circuit substrate 4 may be made so that the above-mentioned four kinds of electrical circuits on the circuit substrate 4 may respectively correspond to the four moving directions, that is, the top, bottom, left and right on the screen, of the character displayed on the screen. These four kinds of electrical circuits may be respectively established as a result of the corresponding four positions, that is, the top, bottom, left and right in FIG. 1 of the key-top member 2, being pushed by the operator. That is, for example, when the operator pushes the top position of the key-top member 2, the corresponding electrical circuit on the circuit substrate 4 is then established, the character on the screen then moving in the top direction. Similarly, the operator may move the character displayed on the screen in any direction among the top, bottom, left and right on the screen.

The operator may push both the top and bottom positions or may push both the left and right positions among the four positions, that is, the top, bottom, left and right positions in FIG. 1 of the key-top member 2. However, even with such a pushing operation being performed by the operator, the construction of the control-key mechanism 100 does not allow the following state to be established. This state is that the corresponding two contact portions, provided on the circuit substrate 2, are respectively simultaneously in contact with by the corresponding two rubber contacts 51 and 51.

This is because, the supporting member 3 is located between these two corresponding rubber contacts 51 and 51. These two rubber contacts 51 and 51 respectively correspond to the top and bottom in FIG. 1 positions of the key-top member 2 or respectively correspond to the left and right positions of the key-top member 2. Thus, in the case where the operator pushes the above-mentioned both positions of the key-top member 2 simultaneously, the key-top member 2 moves downward in FIG. 2 substantially without tilting. Then, the bottom surface 22b of the supported portion 22 comes in contact with the top of the supporting member 3. The key-top member 2 cannot further move downward because the supporting member 2 stops, via the supported portion 22, any further movement of the key-top member 2. Thus, without tilting of the key-top member 2, any of the rubber contacts 51, 51, 51 and 51 cannot come in contact with the contact portion provided on the circuit substrate 4.

When the operator stops pushing the position of the key-top member 2, that is, the finger top of the operator is removed from the key-top member 2, then the lowering of the key-top member 2 is released. This is because, the elastic restoring force of the elastic body 5 has been pushing the key-top member 2. That is, the rubber contacts 51, 51, 51 and 51 have been respectively pushing the contact pushing portions 21, 21, 21 and 21.

Thus, the position and attitude of the key-top member 2 have been returned to those such as in which the key-top member 2 was before the operator had applied force thereon.

Further, in the example of the control-key mechanism 100 being applied on the video game apparatus as mentioned above, the operator may move the character displayed on the screen not only in any one direction among the four directions, that is, the top, bottom, left and right. The operator may also move the character in other four oblique directions, that is, the top-left, top-right, bottom-left and bottom-right.

To achieve each of these four oblique-direction movements of the character, the operator may pushes the corresponding oblique-direction position of the key-top member 2 in FIG. 1. Alternatively, the operator may push both the corresponding positions thereof. For example, to achieve the top-right direction-movement of the character, the operator may push the top-right in FIG. 1 position of the key-top member 2. Alternatively, the operator may push both the top and right positions thereof. Then, the corresponding top-right position of the key-top member 2 then lowers in FIG. 2 accordingly. Thus, both the top position and the right position in FIG. 1 of the key-top member 2 respectively lowers in FIG. 2.

Thus, the key-top member 2 is tilted accordingly and thus the supported portion 22 moves downward in FIG. 2. Thus, the supported portion 22 comes in contact with the top of the supporting member 3. Thus, the key-top member 2 is further tilted about the supporting member 3. In this tilting, both the top and right positions, of the key-top member 2, on the top-right direction position between which top and right positions the operator is pushing, lowers in FIG. 2 so as to become lower than the other two positions, that is, the bottom and left positions.

Thus, the lowering contact portions 21 and 21, corresponding to the above-mentioned lowering positions of the key-top member 2, pushes the corresponding rubber contacts 51 and 51. Thus, these rubber contacts 51 and 51 lower accordingly so as to come in contact with the corresponding contact portions provided on the circuit substrate 4. Thus, the two kinds of circuits on the circuit substrate 4 are established. Then, the character displayed on the screen of the video game apparatus moves in both the corresponding top and right directions simultaneously, that is, the character moves in the corresponding oblique top-right direction.

Similarly, the operator may move the character in any direction among the four oblique directions, that is, the top-right, top-left, bottom-right and bottom left.

As mentioned above, the supporting member 3 is made of a steel made ball. Thus, it is easy to manufacture the supporting member 3 as being an highly accurate sphere shape. Thus, such highly accurate sphere shaped supporting member 3 enables the same operating feeling in manipulation of the key-top member 2 in the various directions' movement or tilting of key-top member 2 about the supporting member 3.

In this embodiment, that is, of the control-key mechanism 100, the sphere shaped supporting member 3 is used and the bottom surface 22b of the supported portion 22 has the plane surface. Thus, in this case, the supported portion 22 comes in contact with the supporting member 3 at only one point. However, a short cylindrical shape as shown in FIG. 7A, may be used as a supporting member instead of the supporting member 3. In this case, the short cylindrical shaped supporting member has the central axis preferably identical to that of the key-top member 2. Further, the short cylindrical shaped supporting member has a circular shaped flat end facing toward the bottom surface of the supported portion 22. The surface area of the flat end is smaller than the area of the bottom surface 22b of the supported portion 22. Thus, when the bottom surface 22b of the supported portion 22 comes in contact with the top surface of the short cylindrical shaped supporting member, any position of the peripheral edge of the top surface of the supporting member may come in contact with the bottom surface 22b of the supported portion 22.

In the case where the short cylindrical shaped supporting member is used, the corresponding control-key mechanism may operates as follows. In certain positions of the key-top member 2, the bottom surface 22b of the supported portion 22 comes in contact with the corresponding position of the peripheral edge of the top surface of the short cylindrical shaped supporting member. Then, the position where the supported portion 22 comes in contact with the supporting member acts as the supporting point about which the key-top member 2 tilts according to the pushing operation being performed by the operator.

While the key-top member 2 tilts in the various directions depending on the operation being performed thereon by the operator, the operation feeling there felt by the operator is identical. This is because, the top surface, having the circular shape, of the short cylindrical shaped supporting member thus has the axial symmetrical shape. Thus, while the supported portion 22 comes in contact with various positions of the peripheral edge of the top surface of the supporting member, the condition of this contact with is uniform.

Further, a square pole shape, as shown in FIG. 7B, is used instead of the cylindrical shaped supporting member only for four-direction control, that is, in the above-mentioned example in the video game apparatus, the top, bottom, left and right directions' movements. Furthermore, an octagonal pole shape, as shown in FIG. 7C, is used instead of the cylindrical shaped supporting member for eight-direction control, that is, in the above-mentioned example in the video game apparatus, the top, bottom, left, right, top-right, top-left, bottom-right and bottom-left directions' movements. In both the cases, the central axes of the poles are preferably identical to that of the key-top member 2 and any position of the peripheral edges of the top surfaces' thereof may respectively come in contact with the bottom surface 22b of the supported portion 22, similarly to the case of the cylindrical shaped supporting member. Further, in each of these cases, the supported portion 22 comes in contact with the pole as the supporting member at the corresponding line as the edge of the square or octagonal.

Furthermore, any shape is allowed to be used instead of the supporting member 3 when the shape allows the following condition. While the supported portion 22 comes in contact with predetermined-direction positions of the peripheral edge of the top surface of the supporting member, the condition of this is uniform. Thus, while the key-top member 2 tilts in the desired-direction positions, the contact condition between the supported portion 22 and the supporting member is uniform.

In the present invention, for example, the above-mentioned embodiment has the construction in which in response to a pushing operation performed by an operator the control-key mechanism 100 operates as follows. First, the key-top member 2 lowers. Thus, the key-top member 2 comes in contact with the supporting member 3. Then, second, the key-top member 2 tilts about the supporting member 3.

Thus, by the above two-steps movements, that is, the lowering movement and the tilting movement of the key-top member 2, the operator may feel modulation in mechanical response from the key-top member 2. Such modulation in mechanical response is needed in control, for example, of the characters movement in the above-mentioned example of the video game apparatus. This is because, if no clear response is offered from a control key when the key is operated by an operator, the operator wonder whether or not his or her operation is effective in control, for example, of the character's movement.

Such mechanical response can be improved by the elastic restoring force offered by the elastic body 5 in response to the operator's pushing operation.

Further, the present invention's construction can offer a uniform operation feeling while the operator operates the key-top member in various relevant directions. This is because, the supporting member has an axial symmetrical shape. That is, the parts of the supporting member, which parts respectively face the various relevant directions, have identical shapes.

The background regarding the control-key mechanism 200 according to the second embodiment of the present invention will now be described.

The control-key mechanism 200 has been invented so as to eliminate the following drawbacks existing in the control-key mechanism 100. That is, as mentioned above, in the control-key mechanism 100, the spherical shaped supporting member 3 is supported in the supporting portion 52 of the elastic body 5. In this construction, the spherical shaped supporting member 3 may move there while the supporting member 3 is pushed by means of the supported portion 2 as a result of the operator pushing the key-top member 2.

As a result, the supporting member 2 may move aside, that is, it may move in the direction along the pushing-force direction. That is, in FIG. 2, if the right side of the key-top member 2 is pushed, the supporting member 3 may move leftward accordingly.

In the case of occurrence of such movement of the supporting member 2, not only the relevant rubber contact 51 but also the other rubber contact(s) 51 adjacent to the relevant one may come in contact with the corresponding contact portions provided on the circuit substrate 4. As a result, in the above-mentioned example in the video game apparatus, the character may move in an undesired direction.

Another drawback in the control-key mechanism 100 will now be described. ABS (Acrylonitrile Butadiene Styrene) resin is preferable to used as material of the key-top member 2. However, ABS resin has inferior abrasion resistance. The supported portion 22 as a part of the key-top member 2 frequently comes in contact with the supporting member 3 preferably made of steel according to frequent operation of the control-key mechanism 100, especially in the above-mentioned example in the video game apparatus.

Such frequent coming in contact with the steel made supporting member 3 results in abrasion occurring in the bottom surface 22b of the supported portion 22, as the counterpart, made of ABS resin. As a result, the mechanical response property in the control-key mechanism 100 become degraded. Thus, the life of the control-key mechanism 100 is shortened.

Nylon resin is preferable to be used as material of the key-top member 2 because nylon resin has a superior abrasion resistance. However, nylon resin has a shrinkage character in its molding step. This shrinkage character in its molding step is such that nylon resin shrinks in its molding step depending on ambient temperature, humidity, and depending on factors regarding cooling water used in the used molding equipment. It is difficult to maintain such various conditions in its molding without regarding the molding time being day time or night time.

Such shrinkage character appears especially in thickness of the construction. Thus, as a result of using nylon resin as material of the key-top member 2, many products of control-key mechanisms such as the control-key mechanism 100 have the same problem. This problem is that spaces between the bottom surfaces 22b of the supported portions 22 and the tops of the supporting members 3 respectively exceed the allowable limit. If such products having the problem were used, both the rubber contacts 51 and 51 located opposite to each other, that is, for example, the left and right rubber contacts 51 and 51 in FIG. 2, would simultaneously come in contact with the corresponding contact portions provided on the circuit substrate 4. Thus, such products cannot be used.

The control-key mechanism 200 according to the second embodiment of the present invention has been invented so as to eliminate the above problems. The first problem is that the supporting member 2 moves aside when the supported portion 22 pushes the supporting member 2. The second problem is that excessive shrunk nylon-resin key-top member 2 creates a control-key mechanism which cannot be used.

Figure 3:
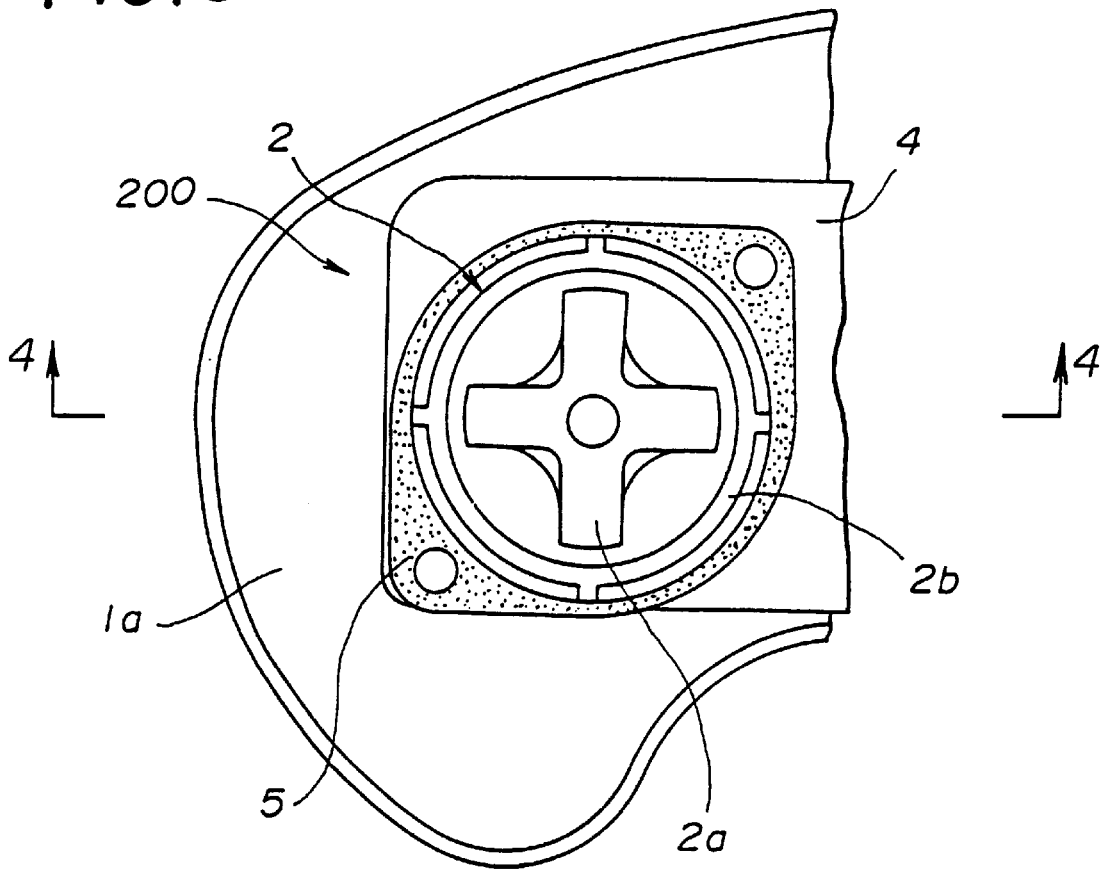
FIG. 3 shows a plan view of a control-key mechanism according to a second embodiment of the present invention, without an upper housing.

The control-key mechanism 200 according to the second embodiment of the present invention will now be described with reference to FIGS. 3 to 5.

This control-key mechanism 200 has a construction identical to the construction of the control-key mechanism 100, according to the first embodiment of the present invention and described above, except for a shape of the bottom, in FIG. 4, surface 22Ab of the supported portion 22A. Thus, the substantially same elements in the mechanism 200, as those in the mechanism 100, respectively have the same reference numerals as those of the elements in the mechanism 100. Further, the description of the constructions and the corresponding operations for the control-key mechanism 200 will thus be omitted, except for those associated with the supported portion 22A and except for the description using FIG. 5.

The control-key mechanism 100 may also have a construction similar to that as shown in FIG. 5 excepting the construction associated with the bottom surface 22Ab.

Figure 4:
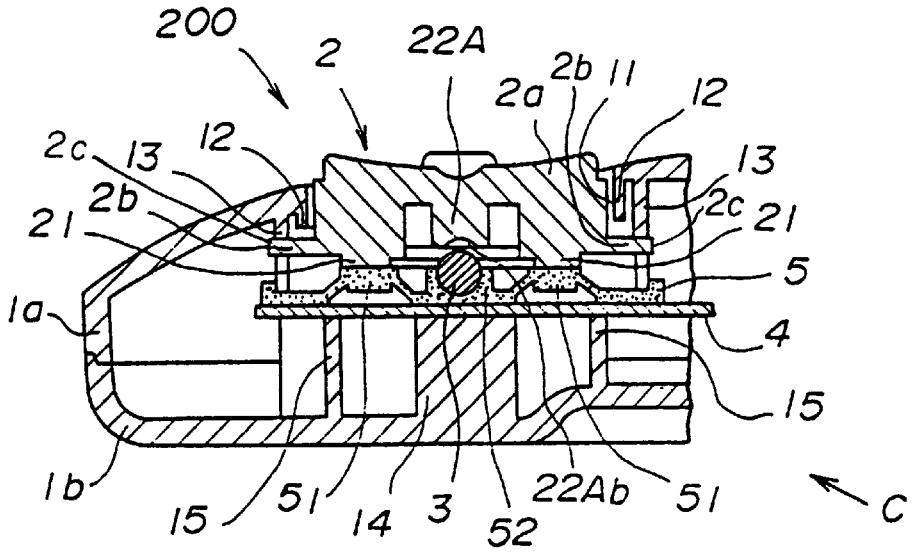
FIG. 4 shows a sectional view of the control-key mechanism shown in FIG. 3 taken along the line 4—4 in FIG. 3, the sectional view including the upper housing while the plane view shown in FIG. 3 is a view in which the upper housing has been removed.

As shown in FIG. B, each of the four contact pushing portions 21, 21, 21 and 21 has walls forming a cross shape when viewed from the bottom in FIG. 4.

The bottom surface 22Ab of the supported portion 22A will now be described with reference to FIGS. 4 and 5. This bottom surface 22Ab has a plane periphery and a concaved center. This concaved center has substantially a partial sphere shape. That is, this concavity has a shape as an inner surface of a partial sphere.

This partial sphere as the concavity of the bottom surface 22Ab is identical to an inner surface of a partial sphere as mentioned above. The diameter of this partial sphere is slightly larger than that of the sphere of the supporting member 3. As shown in FIG. 4, the vertical thickness of the key-top member 2 at the position of the concavity of the bottom surface 22Ab is relatively large. Thus, in the case where nylon resin is used as material of the key-top member 8, in its molding step, this thickness may partially shrink due to the above-mentioned shrinkage character of nylon resin. That is, as a result, a part of the surface of the concavity of the bottom surface 22Ab may be further concaved.

However, while the key-top member 2 is being pushed downward in FIG. 2, then the bottom surface 22Ab is in contact with the supporting member 3 surface to surface. That is, not only a point but also an area of the concavity of the bottom surface 22Ab is in contact with not only a point but also an area of the surface of the supporting member 3. Thus, the above-mentioned partial shrinkage of the thickness associated with the concavity of the bottom surface 22Ab, which shrinkage may occur in its molding step, may not affect the mechanical relationship between the supporting member 3 and the bottom surface 22Ab of the supported portion 22A. This is because a remaining part of the concavity effects to ensure the proper relationship between the supporting member 3 and the bottom surface 22Ab.

As mentioned above, instead of the point contact between the supported portion 22 and the supporting member 3 in the control-key mechanism 100, the control-key mechanism 200 uses the area contact or the surface contact. This area contact or surface contact is formed between the supported portion 22A and the supporting member 3 when the key-top member 2 is pushed. The area contact is formed due to the specific shape of the concavity of the bottom surface 22Ab as mentioned above.

This area contact may also eliminate the above-mentioned other drawback that the supporting member 3 moves aside as a result of the supporting member 3 being biassed by means of the supported portion 22 in the control-key mechanism 100, as mentioned above. This is because, that area contact of the partial sphere shape is effective to reduce the biassed force being applied to the supporting member 3, which force may cause the aside movement of the supporting member 3.

Further, the present invention is not limited to the above described embodiments, and variations and modifications may be made without departing from the scope of the present invention.

What is claimed is:

1. A control-key device *for use with a game device* comprising:

a substrate with [at least a pair] *two pairs* of electrode portions *and a middle portion* formed *on a surface* thereon[,] *so that the electrode portions are located substantially symmetrical with respect to the middle portion,* each of said electrode portions having a pair of separate contacts;

a movable contact member which is formed with respect to each of the corresponding electrode portions, said movable contact member including a movable contact and an elastic member, said movable contact being positioned spacedly from the corresponding electrode portion *and* movably supported on said substrate by said elastic member so that said movable contact comes in contact with the corresponding electrode portions to cause said pair of separate contacts *to be* short-circuited when a downward *movement* force is applied to said movable contact member;

a supporting member formed on said substrate at the middle portion between said [pair] *pairs* of electrode portions; *and* a key-top member including a first portion at which an operator manipulates the movement of said key-top member, a second portion facing to said supporting member, a plurality of third portions contacting said movable contact members, and a plurality of fourth portions protruding outwardly at a side wall of said key-top member, said key-top member being supported by said elastic members through said third portions in a level position so that said second portion is closely spaced from said supporting member when said key-top member is free of a manipulating force at the first portion; and, a housing member having stopper portions corresponding to said fourth portions, said key-top member being arranged so that said key-top member tilts in response to a downward force applied to said first surface while movement of at least one of said third portions locating remotely from the portion at which the downward force is applied is restricted by the corresponding stopper portion.

2. The control-key device according to claim 1, wherein said supporting member is a metal ball and is supported on said substrate by an elastic member.

3. The control-key device according to claim 1, wherein said second portion has a flat plane at the portion facing said supporting member.

4. The control-key device according to claim 1, wherein said second portion has a concave shape at the portion facing said supporting member.

5. The control-key device according to claim 2, wherein said second portion has a concave shape corresponding to the shape of the top surface of said metal ball to which said key-top member contacts.

6. A control-key device *for use with a game device,* comprising:

a substrate with [at least a pair] *two pairs* of electrode members formed on a surface thereof and a center position defined at said surface between said pair of electrode members, said [pair] *pairs* of electrode members being located symmetrically with respect to said center position;

an elastic member [place] *placed* on said substrate, said elastic member comprising a depression on said center position of said substrate and [at least a pair] *two pairs* of protuberant portions disposed on said electrode members, each of said protuberant portions having an electrical contact facing to but closely spaced from the corresponding one of said electrode members so as to operate as a movable contact member against the corresponding electrode member *when a downward force is applied to the protuberant portion*;

a metal member placed partially buried in said depression, supported by said substrate at said center position with the portion of said elastic member located between said metal member and said substrate, and protruding from the surface of said elastic member; and a key-top member having a first portion at which an operator manipulates the movement of said key-top member, a second portion facing to the protruding portion of said metal member, [at least a pair] *two pairs* of third portions contacting the corresponding protuberant portions of said elastic member, and [at least a pair] *two pairs* of fringe portions positioned substantially symmetrically with respect to the second portion of said key-top member, said key-top member being supported by said elastic member at said protuberant portions through said third portions in a level position so that said second portion is closely spaced from said supporting member when said key-top member is free of a manipulating force at the first portion; and a housing member having [at least a pair] *two pairs* of stopper portions corresponding to said [pair] *pairs* of fringe portions of said key-top member, said key-top member being arranged so that said key-top member tilts in response to a downward force applied to said first portion while one of said fringe portions locating remotely from a side at which the downward force is applied is restricted with its movement by the corresponding stopper portion.

7. A control-key *device for use with a game device,* comprising:

a housing member having an opening and two pairs of stopper portions arranged symmetrically with respect to an [imaginal] *imaginary* center line;

a substrate with two pairs of electrode members formed and located at symmetrical positions on an imaginary circle thereon which is registered to said imaginary center line, each of said electrode members having a pair of separate contacts;

an elastic member placed on said substrate and having two pairs of movable contact portions corresponding to said two pairs of electrode members, each of said movable contact portions including a movable contact positioned spacedly from the corresponding electrode member and arranged so that one of said movable contacts to which a downward movement is applied comes in contact with the corresponding one of said electrode members to cause a pair of separate contacts thereof short-circuited;

a supporting member formed on said substrate at the center portion of said imaginary circle; and a key-top member having a first portion at which an operator manipulates the movement of said key-top member, a second portion facing to said supporting member, two pairs of third portions formed correspondingly to, and contacting with, said movable contact portions, and two pairs of fourth portions corresponding to, and facing, said two pairs of stopper portions, said key-top member being supported by said elastic member at said movable contact portions through said third portions in a level position so that said second portion is closely spaced from said supporting member when said key-top member is free of a manipulating force at the first portion, wherein said key top member is arranged so that said key-top member tilts in response to a downward force while one of said third portions locating remotely from a side at which the downward force is applied is restricted with its movement by the corresponding stopper portion.

8. The control-key device according to claim 7, wherein said key-top member has a bottom peripheral disk and said two pairs of said fourth portions are formed at symmetrical positions of said bottom peripheral disk.

9. The control-key device according to claim 8, wherein said elastic member has a depression at a position corresponding to said center portion of the imaginary circle of said substrate and said supporting member is formed on said substrate so that said supporting member is placed partially in said depression, its top portion protrudes out of said elastic member toward said key-top member, and its bottom portion is supported by said elastic member on said substrate.

10. A control-key device *for use with a game device* comprising:

a substrate [with at least a pair] *having two pairs* of electrode portions [formed thereon] *and a middle portion with the electrode portions located substantially symmetrical with respect to the middle portion*, each of said electrode portions having a pair of separate contacts;

a movable contact member which is formed with respect to each of the corresponding electrode portions and includes a movable contact and an elastic member, said movable contact being positioned spacedly from the corresponding electrode portion and movably supported on said substrate by said elastic member so that said movable contact comes in contact with the corresponding electrode portion to cause said pair of separate contacts short-circuited when a downward force is applied to said movable contact;

a supporting member formed on said substrate at the middle portion between said [pair] *pairs* of electrode portions;

a key-top member including a first portion at which an operator manipulates the movement of said key-top member, a second portion facing to said supporting member, a plurality of third portions contacting said movable contact members, and a plurality of fourth portions protruding outwardly from [at] side [wall] *walls* of said key-top member; and a housing member having stopper portions corresponding to said plurality of said fourth portions, said key-top member, said supporting member and said stopper portions being so arranged that, when said key-top member is free of manipulating force at its first portion, said key-top member is maintained in a level position by means of said movable contact members while said fourth portions contact said stopper portions to render a given gap between said second portion and said supporting member.

11. A control-key device *for use with a game device* comprising:

a substrate having [at least a pair] *two pairs* of electrode portions formed on a surface thereof[,] *so as to be substantially symmetrically located with respective to a central position with* each of said electrode portions having a pair of separate contacts;

a resilient member placed on said substrate and comprising:

[at least a pair] *two pairs* of resiliently deformable, protuberant portions formed correspondingly to said [pair] *two pairs* of electrode portions, each of said protuberant portions having [an] *a movable* electrode contact movably supported and facing toward but closely spaced from the corresponding one of said electrode portions *so that said movable contact comes in contact with the corresponding electrode portion to cause said pair of separate contacts to be short-circuited when a downward force is applied to said movable contact*, and a fulcrum-supporting portion having a depression located in [the] *a position corresponding to said* central position [between said pair of protuberant portions];

a fulcrum member placed partially buried in said depression;

a manually manipulatable member comprising a first portion at which an operator manipulates said manually manipulatable member, [at least a pair] *two pairs* of second portions formed correspondingly to, and placed on, said protuberant portions, and a central portion formed correspondingly to said fulcrum member, said manually manipulatable member, said resilient member and said fulcrum member being arranged so that, when said manually manipulatable member is free of a manipulating force at its first portion, said manually manipulatable member is maintained in a level position by means of said protuberant portions to render a given gap between said central portion and said fulcrum member; and a housing member enclosing said substrate, said resilient member, said fulcrum member and said manually manipulatable member, said first portion being exposed to the outside of said housing member, *wherein* said housing member [comprising means for] *comprises a* maintaining *member which maintains* said manually manipulatable member within a predetermined space in the housing member.

12. The control-key device according to claim 11, wherein said manually manipulatable member further comprises fringe means extending from the side wall of said manually manipulatable member, and said maintaining means of said housing member comprises stopper means positioned at an inner surface of said housing member so as to surround said first portion and located so as to detachably contact said fringe means.

13. The control-key device according to claim 11, wherein said fulcrum member has a spherical surface at the position expose from said depression.

14. The control-key device according to claim 11, wherein said central portion of said manually manipulatable member has a flat plane facing said fulcrum member.

15. The control-key device according to claim 13, wherein said central portion of said manually manipulatable member has a concave at the position facing said fulcrum member, said concave having a spherical surface corresponding to the spherical surface of said fulcrum member.

16. A multi-directional switch assembly *for use with a game device* comprising:

a substrate having a plurality of electrical switch terminals formed thereon;

a fulcrum member disposed on said substrate;

a manually manipulatable member disposed so as to detachably contact said fulcrum member and tilt in response to forces applied thereto;

a plurality of movable electrical contact members mounted on said substrate, each of said movable electrical contact members having a movable electrical contact and resilient [means for] *member* resiliently supporting the movable electrical contact and being arranged so that said movable electrical contact moves into and out of engagement with the corresponding electrical switch terminals *in response to downward and upward movement of the movable electrical contact member* in response to *tilting* movement of said manually manipulatable member[, said manually manipulatable member, said movable electrical contact members and said fulcrum member being arranged so that, when said manually manipulatable member is free of a manipulating force, said manually manipulatable member is maintained at a level position and closely spaced from said fulcrum member by means of said resilient means]; and a housing enclosing said substrate, said manually manipulatable member, said fulcrum member and said movable electrical contact members, *whereas* said housing [comprising means for] *comprises a* maintaining *member which maintains* said manually manipulatable member within a predetermined space in the housing.

17. Control-key device *for use with a game device,* comprising:

a substrate having [at least a pair] *two pairs* of electrode portions formed on a surface thereof, each of said electrode portions having a pair of separate*d* contacts;

a resilient member placed on said substrate and comprising

[at least a pair] *two pairs* of resiliently deformable, protuberant portions formed correspondingly to said [pair] *pairs* of electrode portions, each of said protuberant portions having an electrode contact movably supported and facing toward but closely spaced from the corresponding one of said electrode portions *so that said electrode contact comes in contact with the corresponding electrode portion to cause the pair of separate contacts to be short-circuited when a downward force is applied to the protuberant portion*, and a hole portion disposed in a middle position [between said pair of] *surrounded by said* protuberant portions;

a fulcrum member disposed partially in said hole portion so that a portion of said fulcrum member protrudes out of said hole portion; and a manually manipulatable member comprising a first portion at which an operator manipulates said manually manipulatable member, [at least a pair] *two pairs* of second portions formed [corresponding] *correspondingly* to, and disposed on, said protuberant portions, and a central portion formed correspondingly to said protruding portion of the fulcrum member, said manually manipulatable member being maintained in a level position by means of said protuberant portions *so as to provide a given gap between said central portion and protruding portion of said fulcrum member* when said manually manipulatable member is free of a manipulating force.

18. A control key switch assembly for use in a game apparatus to which said control key switch assembly is connected for controlling movement of characters displayed on a monitor, said control key assembly comprising:

a substrate having two pairs of electrode portions formed on a surface thereof, each of said electrode portions having a pair of separate contacts;

a resilient member placed on said substrate and comprising two pairs of resiliently deformable, protuberant portions formed correspondingly to said pair of electrode portions, each of said protuberant portions having an electrode contact movably supported and facing toward but closely spaced from the corresponding one of said electrode portions, and a hole disposed in a middle position between said pair of protuberant portions;

a fulcrum member disposed partially in said hole and protruding out of said hole; and a manually manipulatable member comprising a first portion at which an operator manipulates said manually manipulatable member, two pairs of second portions formed correspondingly to, and disposed on, said protuberant portions, and a central portion formed correspondingly to said protruding portion of the fulcrum member, said manually manipulatable member being maintained in a level position and closely spaced from said fulcrum member by means of said protuberant portions when said manually manipulatable member is free of a manipulating force, said manually manipulatable member being [caused tilting] *tilted* in response to a manipulating force applied to said manually manipulatable member at said first portion to cause a selected one of said electrical contacts to move down to engage [in] the corresponding electrode portions thereby to control movement of characters displayed on the monitor.

19. A multi-directional switch assembly for use with a video game apparatus for controlling movement of an image displayed on a monitor, comprising:

a substrate having plural pairs of electrical switch terminal formed thereon;

a plurality of movable electrical contact members mounted on said substrate, each of said movable electrical contact members having a movable electrical contact and resilient means for resiliently supporting the movable electrical contact and being arranged so that the movable electrical contact moves into and out of engagement with the corresponding pair of electrical switch terminals to constitute an electrical switch;

a manually manipulatable member mounted on said plurality of movable electrical contacts so as to move down said movable electrical contacts in response to forces applied to the manually manipulatable member;

a protruding member disposed on said substrate and underneath said manually manipulatable member for restricting downward movement of said manually manipulatable member; and a housing member having means for movably maintaining said manually manipulatable member within a predetermined space thereof, said movable electrical contact members and said supporting member being arranged so that said manually manipulatable member is movably maintained at a level position and closely spaced from said supporting member by said resilient means when said manually manipulatable member is free of a manipulating force and so that the electrical switches are closed in response to manipulating forces applied to said manually manipulatable member thereby to control movement of the image displayed on the monitor.

20. A video game apparatus with a multi-directional switch assembly for controlling movement of an image displayed on a monitor, said multi-directional switch assembly comprising:

a substrate having plural pairs of electrical switch terminals formed thereon;

a plurality of movable electrical contact members mounted on said substrate, each of said movable electrical contact members having a movable electrical contact and resilient means for resiliently supporting the movable electrical contact and being arranged so that the movable electrical contact moves into and out of engagement with the corresponding pair of electrical switch terminals to constitute an electrical switch;

a manually manipulatable member mounted on said plurality of movable electrical contacts so as to move down said movable electrical contacts in response to forces applied to the manually manipulatable member;

a protruding member disposed on said substrate and underneath said manually manipulatable member for restricting downward movement of said manually manipulatable member; and a housing member having stopper means for restricting upward movement of said manually manipulatable member within a predetermined space thereof, said movable electrical contact members and said supporting member being arranged so that said manually manipulatable member is movably maintained at a level position and closely spaced from said supporting member by said resilient means when said manually manipulatable member is free of a manipulating force and so that the electrical switches are closed in response to manipulating forces applied to said manually manipulatable member thereby to control movement of the image displayed on the monitor.

*21. A multi-directional switch assembly for use with a game device, comprising:*

*a substrate having a middle portion and plural pairs of electrode portions disposed symmetrically with respect to said middle portion, each of said electrode portions being formed with a pair of electrical switch terminals;*

*plural pairs of movable electrical contact members mounted on said substrate, each of said movable electrical contact members having a resilient member and a movable electrical contact movably supported by said resilient member and arranged so that the movable electrical contact moves into and out of engagement with the corresponding pair of electrical switch terminals to constitute an electrical switch;*

*a manually manipulatable member mounted on said plural pairs of movable electrical contact members so as to move down said movable electrical contacts in response to forces applied to the manually manipulatable member, said manually manipulatable member including a concave portion facing said middle portion of said substrate; and*

*a protruding member disposed at said middle portion of said substrate and underneath said manually manipulatable member so as to be closely spaced from said manually manipulatable member when said manually manipulatable member is free of a manipulating force, so as to engage with said concave portion when a force manipulating force causes said manually manipulatable member to come in contact with said protruding member, and so as to prevent the electrical switches symmetrically disposed with respect to said middle portion from being simultaneously switched on,*

*said movable electrical contact members and said protruding member being arranged so that said manually manipulatable member is movably maintained at a level position and closely spaced from said protruding member by said resilient member when said manually manipulatable member is free of a manipulating force.*

*22. A multi-directional switch assembly of claim 21, further comprising a housing member in which said substrate, said plural pairs of movable electrical contact members, said manually manipulatable member, and said protruding member are housed, said manually manipulatable member being movably maintained within a predetermined space of the housing member so as to tilt in response to a manipulating force to push down one of said movable contact members while the upward movement of said manually manipulatable member is restricted by said housing member at a peripheral portion of said manually manipulatable member located oppositely to the pushed down movable electrical contact member.*

*23. A multi-directional switch assembly for use with a game device, comprising:*

*a substrate having a middle portion and plural pairs of electrode portions disposed symmetrically with respect to said middle portion, each of said electrode portions being formed with a pair of electrical switch terminals;*

*plural pairs of movable electrical contact members mounted on said substrate, each of said movable electrical contact members having resilient member and a movable electrical contact movably supported by said resilient member and arranged so that the movable electrical contact moves into and out of engagement with the corresponding pair of electrical switch terminals to constitute an electrical switch;*

*a manually manipulatable member mounted on said plural pairs of movable electrical contact members so as to move down said movable electrical contacts in response to forces applied to the manually manipulatable member;*

*a protruding member disposed at said middle portion of said substrate and underneath said manually manipulatable member so as to be closely spaced from said manually manipulatable member when said manually manipulatable member is free of a manipulating force, so as to restrict downward movement of said manually manipulatable member when a force manipulating force causes said manually manipulatable member to come in contact with said protruding member, and so as to prevent the electrical switches symmetrically disposed with respect to said middle portion from being simultaneously switched on; and*

*a housing member in which said substrate, said plural pairs of movable electrical contact members, said manually manipulatable member, and said protruding member are housed so as to movably maintain said*

*manually manipulatable member within a predetermined space of the housing member;*

*said movable electrical contact members and said protruding member being arranged so that said manually manipulatable member is movably maintained at a level position and closely spaced from said protruding member by said resilient member when said manually manipulatable member is free of a manipulating force,*

*said manually manipulatable member tilting in response to a manipulating force to push down one of said movable contact members while the upward movement of said manually manipulatable member is restricted by said housing member at a peripheral portion of said manually manipulatable member located oppositely to the pushed down movable electrical contact member.*

* * * * *